J. DOMBROUSKI.
PIN SETTER.
APPLICATION FILED NOV. 12, 1908.
953,323.
Patented Mar. 29, 1910.
2 SHEETS—SHEET 1.
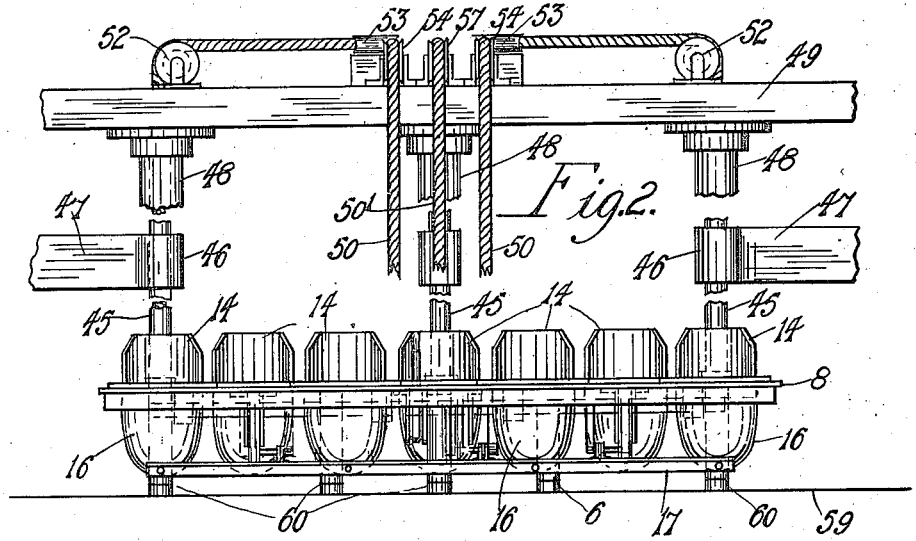
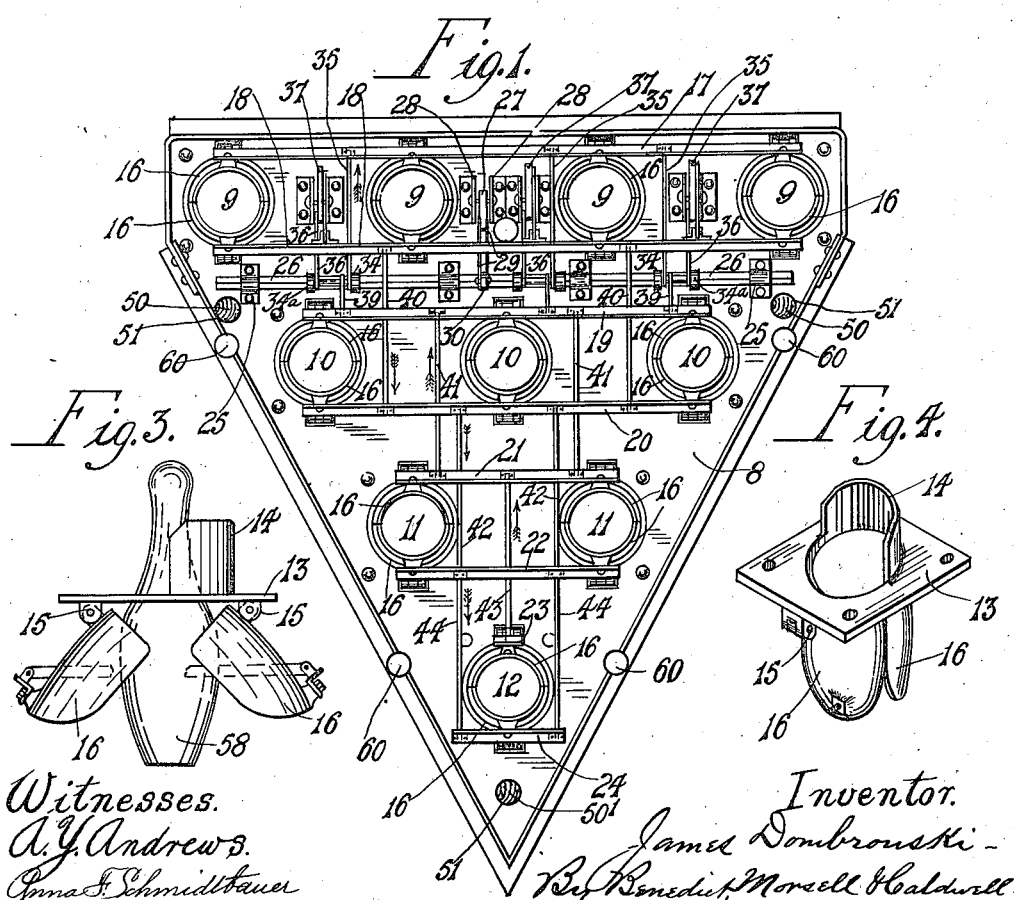
Witnesses.
A. Y. Andrews.
Anna F. Schmidtbauer.
Inventor.
James Dombrouski.
By Benedict, Morsell & Caldwell.
Attorneys.

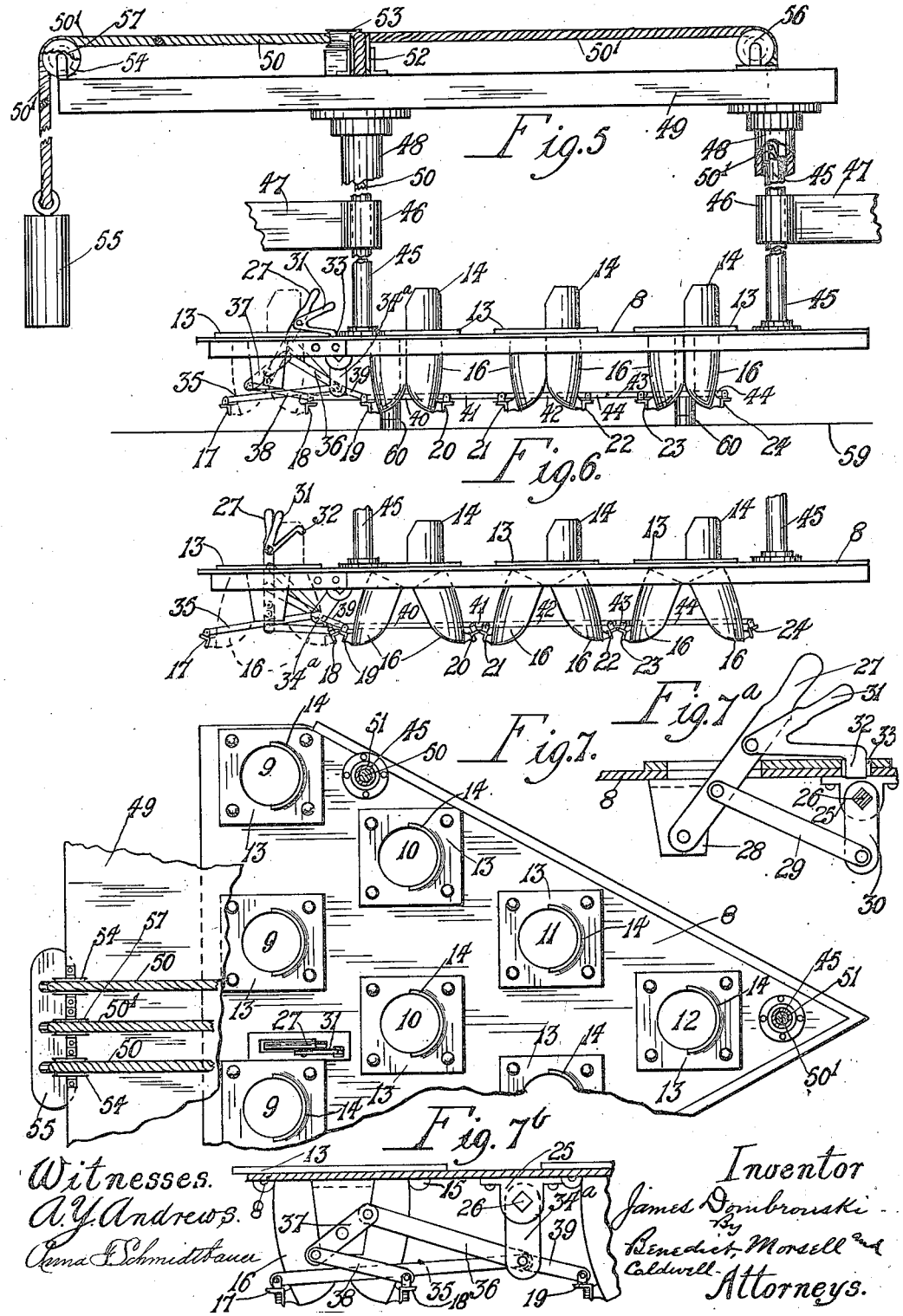

UNITED STATES PATENT OFFICE.

JAMES DOMBROUSKI, OF MILWAUKEE, WISCONSIN.

PIN-SETTER.

953,323. Specification of Letters Patent. Patented Mar. 29, 1910.

Application filed November 12, 1908. Serial No. 462,192.

*To all whom it may concern:*

Be it known that I, JAMES DOMBROUSKI, residing in Milwaukee, in the county of Milwaukee and State of Wisconsin, have invented new and useful Improvements in Pin-Setters, of which the following is a description, reference being had to the accompanying drawings, which are a part of this specification.

My invention has relation to improvements in pin setters, that is to say, to mechanism for setting the pins used in the games of nine-pins and ten-pins.

The object of the invention is to provide an improved means for accurately and quickly setting the pins mechanically.

With the above primary object, and other incidental objects, in view, the invention consists of the devices and parts, or their equivalents, as hereinafter set forth.

In the accompanying drawing, Figure 1 is an inverted plan view of the platform which carries the pin-holding mechanism. Fig. 2 is a rear view of Fig. 1, parts broken away; Fig. 3 is a detail view of one of the pin-holding devices or cages, showing the wings turned to open position; Fig. 4 is a perspective view in detail of one of the pin-holding devices or cages, the wings thereof being shown in closed position; Fig. 5 is an elevation at right angles to Fig. 2, parts broken away, and showing the platform partly raised from the floor, and the wings of the pin-holding devices in closed position; Fig. 6 is a side elevation of the platform which carries the pin-holding devices, showing the wings of said pin-holding devices in open position; Fig. 7 is a plan view of a fragment of the platform, and a fragment of the upper frame; Fig. 7ª is a detail view of the main operating lever and allied mechanism; and Fig. 7ᵇ is a detail view of the mechanism for operating the front and rear wings of the rear line or row of pin-holding devices or cages.

Referring to the drawings, the numeral 8 indicates a platform, preferably of triangular shape, and provided with lines of openings therethrough. The openings of the rear line, which are four in number, are indicated by the numeral 9, the openings of the next line in advance, which are three in number, by the numeral 10, the openings of the next succeeding line in advance which are two in number, by the numeral 11, and the forward single opening by the numeral 12.

A series of apertured plates 13 are provided, one for each platform opening. The upper side of each plate is provided with an upwardly extending curved guide 14, and the under side of each plate at diametrically opposite points, is provided with depending lugs 15, 15, to which are pivoted curved depending pin-holding wings 16, 16. In assembling the pin-holding devices, the wings are brought together and passed through the opening in the platform, so that said wings will be disposed and depend below the platform. The plates are then riveted to the top of the platform, as clearly shown in Fig. 7. For the accommodation of the lugs 15, 15, the platform openings, at diametrically opposite points, have slots branching therefrom. As a matter of convenience in construction, I prefer to have the guides 14 and wings 16, 16 attached to the separate plates 13. It is obvious, however, that without any departure from the spirit and scope of the invention, the plates 13 could be entirely dispensed with, and the guides secured directly to the platform and extend upwardly from the edges of the openings of said platform, and that the wings could be pivoted to lugs extending downwardly from the under side of the platform.

The rear wings of the rearmost line of pin-holding devices are connected so as to be swung in unison by means of a bar 17, preferably of right angular form, and the forward wings of said rearmost line of pin-holding devices are connected by a similar bar 18. The rear wings of the next line of pin-holding devices are connected so as to be swung in unison by means of a bar 19, preferably of right angular form, and the forward wings of said line of pin-holding devices are connected by a similar bar 20. The rear wings of the next line of pin-holding devices are connected by an angle bar 21, and the forward wings of said line by an angle bar 22. The rear wing of the forward single pin-holding device has secured thereto a very short angle bar 23, and the forward wing thereof has connected thereto a somewhat longer angle bar 24. On the under side of the platform 8 is mounted, in suitable bearings 25, 25, a rock-shaft 26, preferably of square form in cross section.

The mechanism of the machine is operated from one main lever 27, said lever extending through an opening in the platform, so that the handle portion thereof is above the platform, and the lower portion of the lever below the platform, the said lower portion being pivoted between brackets 28, 28 depending from the under side of the platform. Straddling a medial point of the lever, and pivoted to said medial point are two links 29, 29, said links extending forwardly and receiving pivotally between their forward ends the lower end of a crank 30 rigidly mounted on and depending from the rock-shaft 26. The upper handle portion of the lever has pivoted thereto a dog or catch 31, preferably in the form of a bell-crank lever, one arm thereof being provided with a depending lug 32 which is adapted, when the dog or catch is turned down to the position shown in Figs. 5 and 7ª, to engage a recess 33 in the platform. The arm which is provided with this lug 32 is heavier than the other arm of the dog, so that said dog is normally in the Fig. 5 locking position. It is intended that the front and rear wings of the rear line of pin-holding devices shall be operated from the rock-shaft 26. One of the mechanisms now about to be described would no doubt be sufficient to accomplish this operation, but for the purpose of distributing the strain, I prefer to employ a plurality of such mechanisms, three being shown in the accompanying drawings. Each one of these mechanisms is operated by a crank 34 depending from the rock-shaft. Pivotally connected to the lower end of this crank is a link 35 which extends rearwardly, and pivotally connects to the rear angle bar 17 of the rear line of pin-holding devices. Also pivotally connected to the crank 34 is another link 36 which extends rearwardly at an upward slant and pivotally connects with one end of a medially pivoted lever 37. To the opposite end of said medially pivoted lever is pivotally jointed a link 38 which extends forwardly and pivotally connects to the forward angle-bar 18 of the rear line of pin-holding devices.

It will be seen from the arrangement described that when the rock-shaft is rocked rearwardly, the link 35 of each of the described mechanisms will push rearwardly on the connecting angle bar 17 and consequently cause a rearward swing of the rear wings 16 of the rear line of pin-holding devices, and that through the intermediary of the link 36, medially pivoted lever 37, and the other link 38, the forward angle bar 18 will be acted upon so as to cause a forward swing of the front wings of the rear line of pin-holding devices. I also operate from the main rock-shaft the rear wings of the second row of pin-holding devices, by connecting a link 39 which extends forwardly from another crank 34ª and is pivotally connected to the rear angle bar 19 of said second row of pin-holding devices, the result being that when the rock shaft is rocked rearwardly, a pull is exerted rearwardly on the bar 19, and consequently the rear wings of the second row of pin-holding devices to which said bar is attached are swung rearwardly on their pivots.

In view of the fact that three sets of the mechanism just described are preferably employed (although as before stated only one set of such mechanism might be used and successful results secured) I have only deemed it necessary to describe one set thereof, and have indicated the several corresponding parts of the two other sets by corresponding reference numerals. It is also, of course, necessary that the forward angle bar 20 of the second row of pin-holding devices be swung so as to produce a forward swing of the forward wings of said second row. To accomplish this, I provide links 40, 40 which are pivotally connected at their rear ends to the forward angle bar 18 of the rear row of pin-holding devices, and pivotally connected at their forward ends to the said angle bar 20. It is obvious that when there is a forward push on the angle bar 18 a corresponding push is given, through the arms 40, to the forward angle bar 20 of the second row of pin-holding devices, and consequently the forward wings of said pin-holding devices are swung forwardly on their pivots. One of the links 40 would no doubt answer the purpose, but for the distribution of the strain, and for greater strength, I prefer to employ two of said links. It is also necessary that a rearward swing be given to the rear wings of the third line of pin-holding devices, and to accomplish this, I provide links 41, 41 which are pivotally connected at their rear ends to the angle bar 19 and at their forward ends to the angle bar 21. It is obvious that when the angle bar 19 is swung rearwardly by the action of the links 39, a pull is exerted in the same direction on the angle bar 21 by means of the links 41, and consequently the rear wings of the third row of pin-holding devices are swung rearwardly. Only one of the links 41 might be provided, but I prefer, for better operation, and equalization of strain, to employ two of such links.

The forward swing of the forward wings of the third row of pin-holding devices is effected by means of links 42, 42, which at their rear ends are pivotally connected to the angle bar 20, and at their forward ends are connected to the forward angle bar 22 of the forward wings of said row of wings. In view of the fact that the angle bar 20 is thrown forwardly, the angle bar 22 will be moved in the same direction, through the intermediary of the links 42, and consequently the forward wings of the third row of pin-holding devices will be swung forwardly.

For effecting the rearward swing of the rear wing of the single pin-holding device at the forward end of the platform, I provide a link 43 which is secured at its rear end to the angle bar 21, and at its forward end to the short angle bar 23. In view of the fact that the angle bar 21 is pulled rearwardly, the short angle bar 23 is, through the connecting link 43, pulled in the same direction, and consequently the front wing of the forward pin-holding device is thereby swung rearwardly.

For turning forwardly the front wing of the forward pin-holding device, I provide extensions 44, 44 to the links 42, and connect the forward ends of said extensions to opposite ends of the angle bar 24. As the angle bar 22 moves forwardly when actuated, it will be obvious that the angle bar 24, through the described connection, will be moved in the same direction, and consequently the front wing of the forward pin-holding device will be swung forwardly.

Extending upwardly from the platform 8 are three tubular posts 45, two of said posts being located at the rear corners of the platform, and the third post at the forward extremity of said platform. These posts pass freely through eyes 46 formed at the ends of bracket arms 47, said bracket arms extending from a wall, or other support. The upper ends of these tubular posts telescopically fit short tubes 48 depending from the under side of an upper frame 49, and have a limited movement vertically in the tubes 48. The upper frame 49 is advisably of the same shape as the lower platform 8. Ropes 50, 50 and 50' are secured beneath the platform 8 by any desirable means, as by knotting the ends thereof, and these ropes are passed through openings 51 in the platform, said openings being in registration with the tubes 45. These ropes are continued upwardly through the tubes and through the upper frame. The two ropes 50 which pass through the rear corner posts 45 extend over pulleys 52, 52 which are mounted on horizontal axial pins journaled in bearings in the upper frame. The said ropes are then continued inwardly toward the center of the upper frame, then around horizontally mounted guide pulleys 53, 53, thence over pulleys 54, 54 at the rear end of the upper frame, and finally connected to a common weight 55. The rope 50' which extends through the forward tubular post 45 passes through the upper frame, thence over a pulley 56 near the forward end of said frame, thence continued rearwardly over another pulley 57 at the rear end of the upper frame, and thence downwardly for connection to the weight 54.

The above being a description of the construction of the apparatus, I will now describe the operation of the mechanism.

It will be understood that the weight 55 is sufficiently heavy to exert a pull through the ropes 50 50 and 50' of sufficient force to maintain the platform 8 in a raised position, and at such height as to cause the lower ends of the wings 16 to just clear the upper ends of the pins 58 which are set on the floor 59. The weight is also sufficiently heavy as not only to hold the said platform and the mechanism carried thereby in this raised position, but also maintain the platform in a raised position when the additional weight of the pins retained in the pin-holding devices is added thereto. The wings 16 when not retaining or holding the pins, are in their closed position, as illustrated in Fig. 4, being releasably locked in said position by means of the lug 32 of the dog or catch 31 engaging the recess 33. When a game is to be played, the first step is to adjust the pins to the several pin-holding devices. This is done by the alley boy or attendant pushing the pins into engagement with the holding devices, with the base of each pin pointing downwardly, each pin being pushed until the base thereof is about flush with the lower ends of the wings. The guides 14, of course, facilitate this operation. Indeed, an alley boy or attendant may become so proficient as to be able to throw the pins into the different cages or holders, the guides greatly facilitating the proper positioning of each pin, base down. It will be noticed that the inner surfaces of the wings are shaped to conform to the contour of the sides of the pin. When all the pin-holding devices or cages are loaded, the attendant places his hands on the platform, preferably at the rear thereof, and pushes downwardly on said platform with sufficient force to overcome the counteracting influence or effect of the weight. The platform is thus pushed downwardly until the legs 60 depending from the under side of said platform contact with the floor or surface 59. When this occurs the upper arm of the dog or catch 31 is pulled toward the main lever 27. This has the effect of raising the lug 32 out of engagement with the recess 33, and consequently unlocking the lever 27, and permitting said lever to be turned. The lever is now turned by the operator toward the rear of the platform. This has the effect of rocking the rock-shaft 26 toward the rear, and with this rocking of said shaft, all the wings 16 of the several pin-holding devices or catches are swung on their pivots to open position in the manner herein before fully explained, and consequently the pins are released, and in condition to be left standing properly positioned on the floor 59. Downward pressure on the platform 8 is now removed, and the weight 54 will then have the effect of pulling the platform 8 upwardly to such height as to clear the upper ends of the pins. While the platform is thus raised, the cages may be filled with another set of pins, so that when the pins of the first set, and which were set up on the floor 59, are knocked down, they can be swept aside by the attendant, and the platform, loaded with the second set of pins, immediately lowered, and said second set of pins set up, without the attendant delay usually encountered between the knocking down of the pins and the resetting of the same pins, as in the ordinary and most usual method.

What I claim as my invention is:

1. In a pin setter, the combination of a platform provided with a series of apertures, two wings for each aperture, said wings depending from the bordering edges of the aperture and pivoted to the platform, means for holding the wings in a closed position to retain the pin therebetween, a rock-shaft journaled in bearings in the platform, a lever connected to said rock-shaft and adapted to rock the same, and connections between the rock-shaft and the several wings, said connections when the lever is operated to turn the shaft in one direction adapted to swing the wings to an open position and release the pins.

2. In a pin setter, the combination of a platform provided with a series of apertures, two wings for each aperture, said wings depending from the bordering edges of the apertures and pivoted to the platform, means for normally holding the wings in a closed position to retain the pin therebetween, a rock-shaft journaled in bearings in the platform, a lever connected to said rock-shaft and adapted to rock the same, a dog or catch pivoted to the lever and provided with a lug adapted to engage a recess in the platform and thereby normally hold the lever in a locked condition, and connections between the rock-shaft and the several wings, said connections, when the lever is operated to turn the shaft in one direction, adapted to swing the wings to an open position and thereby release the pins.

3. In a pin setter, the combination of a platform provided with a series of apertures, two wings for each aperture, said wings depending from the bordering edges of the apertures and pivoted to the platform, means for normally holding the wings in a closed position to retain the pin therebetween, a rock-shaft journaled in bearings in the platform, a lever connected to said rock-shaft and adapted to rock the same, connections between the rock-shaft and the several wings, said connections, when the lever is operated to turn the shaft in one direction, adapted to swing the wings to an open position and thereby release the pins, and means for raising and lowering the platform.

4. In a pin setter, the combination of a platform provided with a series of apertures arranged in transverse lines across the platform, the number of apertures in each transverse line gradually decreasing toward the forward end of the platform, two wings for each aperture, said wings depending from the bordering edges of the apertures and pivoted to the platform, means for normally holding the wings in a closed position to retain the pins therebetween, rods connecting the rear and forward wings of each line of wings, a rock-shaft journaled in bearings in the platform, connections between the rock-shaft and the rear and front wings of the rear line of wings and between the rock-shaft and the rear wings of the second line of wings, connections between the several connecting bars of the several lines of wings, a crank depending from the rock-shaft, a pivoted lever, a link connection between the pivoted lever and the crank of the rock-shaft, whereby when the lever is turned rearwardly the rock-shaft is turned in the same direction and the several wings thereby opened, and means for raising and lowering the platform.

5. In a pin setter, the combination of a platform provided with a series of apertures arranged in transverse lines across the platform, the number of apertures in each transverse line gradually decreasing toward the forward end of the platform, two wings for each aperture, said wings depending from the bordering edges of the apertures and pivoted to the platform, a guide extending upwardly from the bordering edge of each aperture, means for normally holding the wings in a closed position to retain the pins therebetween, rods connecting the rear and forward wings of each line, a rock-shaft journaled in bearings in the platform, connections between the rock-shaft and the rear and front wings of the rear line of wings and the rear wings of the second line of wings, connections between the several connecting bars of the several line of wings, a pivoted lever, a crank depending from the rock-shaft, a link connection between the pivoted lever and the crank, whereby, when the lever is turned rearwardly, the rock-shaft is turned in the same direction and the several wings thereby opened, and means for raising and lowering the platform.

6. In a pin setter, the combination of a platform provided with a series of apertures arranged in transverse lines across the platform, the number of apertures in each line gradually decreasing toward the forward end of the platform, two wings for each aperture, said wings depending from the bordering edges of the apertures, and pivoted to the platform, means for normally holding the wings in a closed position to retain the pins therebetween, rods connecting the rear and forward wings of each line of wings, a rock-shaft journaled in bearings in the platform, a crank depending from the rock-shaft, a link extending rearwardly from the crank and connecting with the rear connecting bar of the rear wings of the rear line of wings, a second crank, another link extending rearwardly from the latter crank, a medially pivoted lever to one end of which said latter link connects, a link connected to the opposite end of said medially pivoted lever and extending forwardly and connecting with the forward connecting bar of the rear line of wings, a link extending forwardly from the second mentioned crank and connecting with the rear connecting bar for the rear wings of the second line of wings, a pivoted operating lever, a link pivoted thereto and extending forwardly therefrom, another crank depending from the rock-shaft and with which crank said latter link connects, a link connection between the forward connecting bar of the forward wings of the rear line of wings and the connecting bar of the forward wings of the second line of wings, a link connection between the rear connecting bar of the rear wings of the second line of wings and the connecting bar of the rear wings of the third line of wings, a link connection between the forward connecting bar of the forward wings of the second line of wings and the forward connecting bar for the forward wings of the third line of wings, a link connection between the rear connecting bar for the rear wings of the third line of wings, and the rear wing of the foremost set of wings, a link connection between the forward connecting bar for the forward wings of the third line of wings and the forward wing of the foremost set of wings, and means for raising and lowering the platform.

7. In a pin setter, the combination of a platform provided with a series of pin holding devices, means for normally holding the pin holding devices in a closed position to retain the pin therebetween, means for throwing said pin holding devices to an open position to release the pins, tubular posts extending upwardly from the platform, a fixed frame above the platform, tubes depending from said fixed frame and into which tubes the tubular posts telescope and have a limited movement therein up and down, and ropes secured to the platform and extending upwardly through the tubular posts and through the fixed frame and over pulleys mounted on said frame, and extending to and connecting with a common weight.

In testimony whereof, I affix my signature, in presence of two witnesses.

JAMES DOMBROUSKI.

Witnesses:
A. L. MORSELL,
OTTO FISCHER.